(12) United States Patent
Choi et al.

(10) Patent No.: US 12,223,844 B2
(45) Date of Patent: Feb. 11, 2025

(54) METHOD AND APPARATUS FOR MANAGING IDENTIFICATION INFORMATION OF UNMANNED AERIAL VEHICLE

(71) Applicant: ELECTRONICS AND TELECOMMUNICATIONS RESEARCH INSTITUTE, Daejeon (KR)

(72) Inventors: Su Na Choi, Daejeon (KR); Kyu Min Kang, Daejeon (KR); Jae Cheol Park, Daejeon (KR); Jin Hyung Oh, Daejeon (KR); Dong Woo Lim, Daejeon (KR); Sung Hyun Hwang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 259 days.

(21) Appl. No.: 17/945,255

(22) Filed: Sep. 15, 2022

(65) Prior Publication Data

US 2023/0095120 A1    Mar. 30, 2023

(30) Foreign Application Priority Data

Sep. 29, 2021    (KR) .................. 10-2021-0128623

(51) Int. Cl.
*G08G 5/00*    (2006.01)
*H04L 1/18*    (2023.01)

(52) U.S. Cl.
CPC ......... *G08G 5/0026* (2013.01); *G08G 5/0013* (2013.01); *H04L 1/18* (2013.01)

(58) Field of Classification Search
CPC .. G08G 5/0026; G08G 5/0013; G08G 5/0052; G08G 5/0069; G08G 5/0082;
(Continued)

(56) References Cited

U.S. PATENT DOCUMENTS 10,073,449 B1 * 9/2018 Sait .................. H04L 67/02
10,360,803 B2 * 7/2019 Postrel ................ G05D 1/104
(Continued)

FOREIGN PATENT DOCUMENTS

JP    2002-269034 A    9/2002
KR    10-2014-0137826 A    12/2014
(Continued)

*Primary Examiner* — Nam V Nguyen
(74) *Attorney, Agent, or Firm* — LRK PATENT LAW FIRM

(57) ABSTRACT

A method of managing identification information of a drone may include: generating an access message, wherein the access message includes an identifier for the ground identification device, which is a transmitter, an identifier for a receiver, an execution function command for classifying and defining a function to be performed, a serial number for transmitting information sequentially and retransmitting the information when transmission fails, data size information for informing a size of data to be transmitted, and transmission data; and transmitting the access message to an integrated management system corresponding to the identifier for the receiver.

20 Claims, 5 Drawing Sheets

(58) Field of Classification Search
CPC ....... H04L 1/18; H04L 1/0084; H04L 1/1867;
H04W 8/26; H04W 4/025; H04W 4/40;
H04W 84/06
USPC ........................................................ 340/5.61
See application file for complete search history.

(56) References Cited

U.S. PATENT DOCUMENTS

| | | | |
|---|---|---|---|
| 10,679,510 B2* | 6/2020 | Gong | G08G 5/0013 |
| 10,885,793 B2 | 1/2021 | Ouyang et al. | |
| 11,094,203 B1* | 8/2021 | Muirhead | B64U 10/14 |
| 11,653,292 B2 | 5/2023 | Azizi et al. | |
| 11,994,881 B2* | 5/2024 | Oh | G05D 1/693 |
| 2018/0211548 A1* | 7/2018 | Postrel | G08G 5/0008 |
| 2020/0174468 A1 | 6/2020 | Hong | |
| 2022/0180759 A1* | 6/2022 | Kang | G08G 5/0026 |
| 2022/0245380 A1* | 8/2022 | Fernandez | B64D 47/06 |

FOREIGN PATENT DOCUMENTS

| | | |
|---|---|---|
| KR | 10-1594402 B1 | 2/2016 |
| KR | 10-2017-0067054 A | 6/2017 |
| KR | 10-2017-0067195 A | 6/2017 |
| KR | 10-1837979 B1 | 3/2018 |
| KR | 10-2019-0093204 A | 8/2019 |
| KR | 10-2019-0112336 A | 10/2019 |
| KR | 10-2021-0039793 A | 4/2021 |

* cited by examiner

METHOD AND APPARATUS FOR MANAGING IDENTIFICATION INFORMATION OF UNMANNED AERIAL VEHICLE

CROSS-REFERENCE TO RELATED APPLICATION(S)

This application claims priority to Korean Patent Application No. 10-2021-0128623, filed on Sep. 29, 2021, with the Korean Intellectual Property Office (KIPO), the entire contents of which are hereby incorporated by reference.

BACKGROUND

1. Technical Field

Exemplary embodiments of the present disclosure relate to a technique for integrally managing identification information of a drone (unmanned aerial vehicle), and more specifically, to a method and apparatus for managing identification information of a drone, which use a ground identification device, an integrated management system, and an access method therebetween to integrally manage wireless identification information transmitted from the drone.

2. Description of Related Art

Recently, as the use of drones or unmanned aerial vehicles (UAVs) is increased worldwide, cases of dysfunction such as invasion of privacy, security threats to important facilities, and the like are continuously increasing.

In the case of small drones, ordinary people can easily access the drone even without specific expertise, and due to the nature of drones that can be remotely controlled, the burden of exposing personal information of a drone operator or owner is low, and thus there is a tendency for the drone operator to neglect his/her safety responsibility that the operator of the drone should have by hiding behind such anonymity. In addition, the drones are highly likely to be abused for various criminal acts using the advantages of air movement, and there are difficulties in tracking and verifying responsibility when abused.

Therefore, it is necessary to establish a basis for checking whether the flight of the drone is legal or illegal with the drone owner and for managing insurance information and the like for follow-up actions in the event of an accident.

However, there is currently no system for identifying basic information on drones, such as owner information, insurance information, aircraft registration information, etc., in the field and responding to the criminal use of small drones, illegal flight in no-fly zones, or the like.

In this way, a ground identification device that receives identification information transmitted by a drone on the ground, and a management system that stores and integrally manages the received identification information of the drone in a database (DB) are required, and, in addition, there is a need for a system for allowing the ground identification device to access the integrated management system and transmit the identification information of the drone.

SUMMARY

Accordingly, exemplary embodiments of the present disclosure are provided to substantially obviate one or more problems due to limitations and disadvantages of the related art.

Exemplary embodiments of the present disclosure provide a ground identification device, an integrated management system, and an access method therebetween, which integrally manage wireless identification information transmitted from a drone.

Exemplary embodiments of the present disclosure also provide a method and apparatus form anaging identification information of a drone, which are capable of acquiring the identification information of the drone through a ground identification device and storing and managing the identification information of the drone in a database.

Objects of exemplary embodiments of the present disclosure are not limited to the above-mentioned objects and other objects and advantages of the exemplary embodiments of the present disclosure which are not mentioned can be understood by the following description and more clearly understood by the exemplary embodiments of the present disclosure. It will also be readily apparent that the objects and advantages of the exemplary embodiments of the present disclosure may be realized and attained by the means and combinations thereof set forth in the appended claims.

According to a first exemplary embodiment of the present disclosure, a method of managing, by a ground identification device, identification information of a drone may comprise: generating an access message, wherein the access message includes an identifier for the ground identification device, which is a transmitter, an identifier for a receiver, an execution function command for classifying and defining a function to be performed, a serial number for transmitting information sequentially and retransmitting the information when transmission fails, data size information for informing a size of data to be transmitted, and transmission data; and transmitting the access message to an integrated management system corresponding to the identifier for the receiver.

The method may further comprise: transmitting an access message for requesting the identifier for the transmitter to the integrated management system, wherein the identifier for the transmitter is set as its own unique identifier; and receiving a response message for allocating the identifier for the transmitter in response to the access message for the request from the integrated management system, wherein the identifier for the transmitter which is allocated by the integrated management system is used when a subsequent access message is configured.

The generating of the access message may include setting an execution function command for transmitting operation state information of the ground identification device, generating data size information, and configuring transmission data including the operation state information of the ground identification device.

The operation state information of the ground identification device may include location information including a location, a longitude, and an altitude, first information related to an operation state of the ground identification device, second information related to a communication method used for drone identification, and third information related to a communication frequency used for drone identification.

The generating of the access message may include setting an execution function command for transmitting the identification information of the drone, generating data size information, and configuring transmission data including the identification information of the drone.

The identification information of the drone may include an identifier for the drone, an operation state of the drone, location information including a location, a longitude, and an altitude of the drone, a moving speed of the drone, a moving direction of the drone, and an identification date and time of the drone.

The method may further comprise: receiving an access message for an initialization request from the integrated management system; performing an initialization process in response to the access message for the initialization request; and transmitting an initialization response message corresponding to the access message for the initialization request to the integrated management system.

The method may further comprise: receiving an access message for a restart request from the integrated management system; performing a restart process in response to the access message for the restart request, wherein, in the restart process, integrated management information including the identifier for the ground identification device and an identifier for the integrated management system, which are allocated from the integrated management system, is maintained; and transmitting a restart response message corresponding to the access message for the restart request to the integrated management system.

According to a second exemplary embodiment of the present disclosure, a method of managing, by an integrated management system connected to a ground identification device through a network, identification information of a drone may comprise: receiving an access message from the ground identification device, wherein the access message includes an identifier for the ground identification device, which is a transmitter, an identifier for the integrated management system, which is a receiver, an execution function command for classifying and defining a function to be performed by the ground identification device, a serial number for transmitting information sequentially and retransmitting the information when transmission fails, data size information for informing a size of data to be transmitted, and transmission data; interworking with at least one of the ground identification device and a drone controller for drone identification on the basis of the information included in the access message; and receiving an access message including the identification information of the drone from at least one of the ground identification device and the drone controller, wherein the identification information of the drone includes an identifier for the drone, an operation state of the drone, location information including a location, a longitude, and an altitude of the drone, a moving speed of the drone, a moving direction of the drone, and an identification date and time of the drone.

The method may further comprise: receiving an access message for requesting identifier allocation from the ground identification device; allocating a first identifier for the ground identification device; and transmitting a response message including the first identifier to the ground identification device.

The method may further comprise, after the transmitting of the response message to the ground identification device is performed, receiving a message including operation state information of the ground identification device from the ground identification device.

The operation state information of the ground identification device may include location information including a location, a longitude, and an altitude, first information related to an operation state of the ground identification device, second information related to a communication method used for drone identification, and third information related to a communication frequency used for drone identification.

The method may further comprise: transmitting an access message for an initialization request to the ground identification device; and receiving an initialization response message corresponding to the access message for the initialization request from the ground identification device.

The method may further comprise: transmitting an access message for a restart request to the ground identification device; and receiving a restart response message corresponding to the access message for the restart request from the ground identification device, wherein, in the restart process performed by the ground identification device in response to the access message for the restart request, integrated management information including the identifier for the ground identification device and the identifier for the integrated management system, which are allocated from the integrated management system, is maintained.

The method may further comprise receiving an access message including other identification information of the drone from a controller of the drone.

The method may further comprise, before the receiving of the access message including other identification information of the drone from the controller is performed, receiving an access message for a controller identifier check request from the controller; transmitting a controller identifier check response message corresponding to the access message for the controller identifier check request to the controller; and receiving identification information of the controller from the controller.

The identification information of the controller may include an identifier for the controller, location information of the controller, and an identification date and time of the controller.

According to a third exemplary embodiment of the present disclosure, an apparatus for managing identification information of a drone may comprise: a ground identification device access device configured to access a ground identification device that receives a signal from the drone and transmit information; a controller access device configured to access a controller of the drone and transmit information; an identification information management device configured to manage the identification information of the drone, which is received through the ground identification device access device, the controller access device, or both the ground identification device access device and the controller access device; and a database configured to store the identification information, wherein the ground identification device access device allocates an identifier to the ground identification device in response to a request of the ground identification device to transmit the identifier for the ground identification device to the ground identification device, and receives an access message including operation state information of the ground identification device as transmission data from the ground identification device, the controller access device allocates an identifier to the controller in response to a request of the controller to transmit the identifier for the controller to the controller, and receives an access message including operation state information of the controller as transmission data from the controller, and the access message includes an identifier for a transmitter, an identifier for a receiver, an execution function command for classifying and defining a function to be performed, a serial number for transmitting information sequentially and retransmitting the information when the transmission fails, data size information for informing a size of data to be transmitted, and transmission data.

The operation state information of the ground identification device may include location information including a location, a longitude, and an altitude, first information related to an operation state of the ground identification device, second information related to a communication method used for drone identification, and third information related to a communication frequency used for drone identification.

The identification information of the controller may include the identifier for the controller, location information of the controller, and an identification date and time of the controller.

According to the exemplary embodiments of the present disclosure, it is possible to provide an access method between a ground identification device and an integrated management system, which is capable of effectively integrally managing wireless identification information transmitted from a drone.

Further, according to the exemplary embodiments of the present disclosure, it is possible to provide a drone identification information management apparatus which is capable of acquiring identification information of a drone through a ground identification device and storing and managing the identification information of the drone in a DB.

Further, according to the exemplary embodiments of the present disclosure, it is possible to provide an access method in which a ground identification device that receives identification information transmitted by a drone on the ground accesses an integrated management system to transmit ground identification device operation state, drone identification information, or the like, and the access method can contribute to effectively managing drone information and making a safe drone environment base through drone identification.

DETAILED DESCRIPTION OF THE EMBODIMENTS

Figure 1:
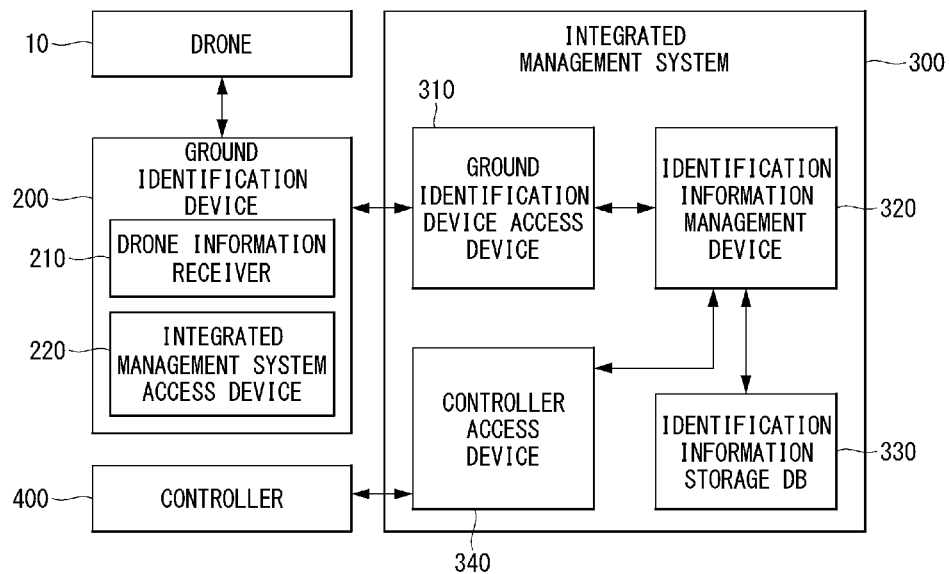
FIG. 1 is a block diagram illustrating the overall configuration of a drone identification information management system according to an exemplary embodiment of the present disclosure.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a block diagram illustrating the overall configuration of a drone identification information management system according to an exemplary embodiment of the present disclosure.

Referring to FIG. 1, the drone identification information management system may include a ground identification device 200, an integrated management system 300, and a controller 400.

The ground identification device 200 includes a drone information receiver 210 and an integrated management system access device 220, receives identification information transmitted by a drone 10 through the drone information receiver 210 on the ground, and accesses the integrated management system 300 through the integrated management system access device 220 to transmit the identification information of the drone.

Similarly, the controller 400 may include a drone control device for controlling the drone and an integrated management system access device for accessing the integrated management system, and transmit self-managed identification information of the drone to the integrated management system 300.

The integrated management system 300 is a device for storing and integrally managing the identification information of the drone, and includes a ground identification device access device 310 for transmitting information by accessing the ground identification device 200 through a network, a controller access device 340 for transmitting information by accessing the controller 400 through the network, an identification information management device 320 for managing the identification information of the drone, which is received through at least one of the ground identification device access device and the controller access device, and an identification information storage database (DB) 330 for storing and managing the identification information of the drone or the like.

The ground identification device, the integrated management system, and the controller may each include an access device or communication module for transmitting or receiving signals and data to or from each other through the network, and in terms of the above aspects, the access device or the communication module may be referred to as a communication node.

The network may support a mobile communication network, for example, fourth generation (4G) communication, such as long-term evolution (LTE), LTE-A (LTE advanced), or fifth generation (5G) communication, such as New Radio (NR), which is defined in the 3$^{rd}$ Generation Partnership Project (3GPP) standard, or the like. Here, 4G communication may be performed using a frequency of about 6 GHz or less, and 5G communication may be performed using a frequency of about 6 GHz or more as well as the frequency of about 6 GHz or less.

Further, the network may include a wired or wireless local area network (LAN). The wireless LAN may include Wi-Fi, Bluetooth, etc. In this case, the ground identification device, the integrated management system, and the controller may be connected through a wireless LAN or a wired/wireless Internet network other than mobile communication to transmit or receive signals and data.

Further, the network may further include a core network. When the network supports 4G communication, the core network may include a serving gateway (S-GW), a packet data network (PDN) gateway (P-GW), a mobility management entity (MME), or the like. When the network supports 5G communication, the core network may include a user plane function (UPF), a session management function (SMF), an access and mobility management function (AMF), or the like.

Further, the network may further include a satellite network or a wired/wireless Internet. The satellite network or the wired/wireless Internet may be combined with a LAN, a mobile communication network, a vehicle network, a maritime network, or combinations thereof.

Figure 2:
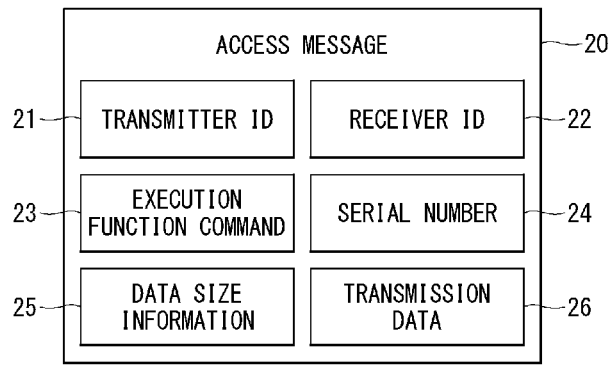
FIG. 2 is a block diagram illustrating a configuration of messages for interconnection between the ground identification device and the integrated management system or for interconnection between the controller and the integrated management system in the system of FIG. 1.

FIG. 2 is a block diagram illustrating a configuration of messages for interconnection between the ground identification device and the integrated management system or for interconnection between the controller and the integrated management system in the system of FIG. 1.

Referring to FIG. 2, an access message has a message configuration for managing the identification information of the drone. That is, an access message 20 includes a transmitter identifier 21 for identifying a device that transmits information, a receiver identifier 22 for specifying and identifying a device that receives information, an execution function command 23 for classifying and defining a function to be performed, a serial number 24 for transmitting information sequentially and retransmitting the corresponding information when transmission fails, data size information 25 for informing the size of data to be transmitted, and transmission data 26. The identifier may be referred to as an identification (ID), and at least one of the transmitter identifier and the receiver identifier may be set as its own unique identifier.

Figure 3:
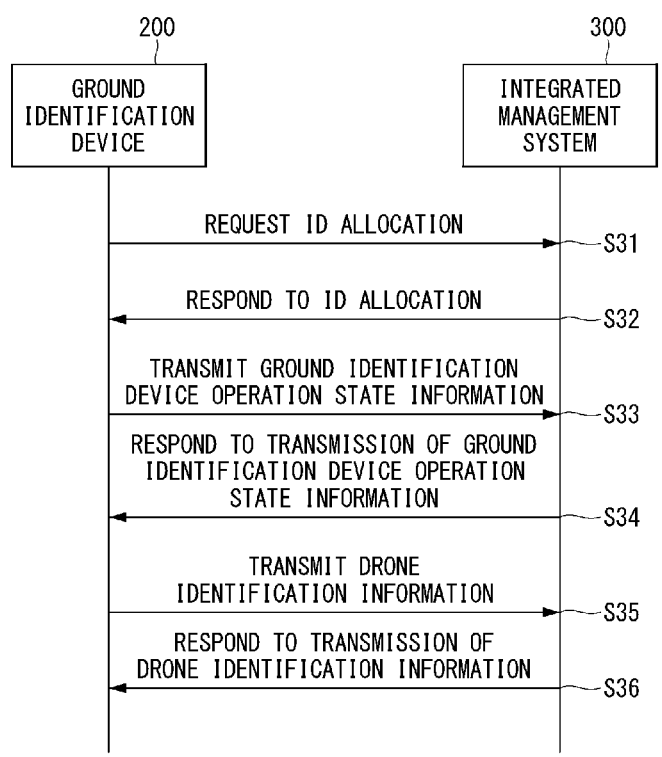
FIG. 3 is a flowchart for describing an interworking function between a ground identification device and an integrated management system that can be employed in the system of FIG. 1.

FIG. 3 is a flowchart for describing an interworking function between a ground identification device and an integrated management system that can be employed in the system of FIG. 1.

In the present embodiment, a ground identification device 200 and an integrated management system 300 interwork with each other to manage identification information of a drone. To this end, the ground identification device 200 may first transmit an access message for an access request to the integrated management system 300.

Referring to FIG. 3, the ground identification device 200 requests allocation of an identifier (ID) from the integrated management system 300 (S31), and receives an identifier allocation response from the integrated management system 300 (S32). The integrated management system 300 may allocate an identifier to the ground identification device 200 in response to the identifier allocation request and add the identifier to a response message to respond to the ground identification device. The ground identification device 200 may pre-store the identifier for the integrated management system 300 or receive the identifier for the integrated management system 300 from the integrated management system 300 through a response message. The response message may be, for example, an access message corresponding to a response to the identifier allocation request.

Such identifier allocation may be preferentially performed for interworking between the ground identification device 200 and the integrated management system 300, and a subsequent identifier allocation for interworking between the ground identification device 200 and the integrated management system 300 may be achieved after adding and transmitting the allocated identifier to an access message when transmitting or receiving information or messages.

Next, the ground identification device 200 may transmit an access message including operation state information of the ground identification device, including the allocated identifier, to the integrated management system 300 (S33), and receive a response message indicating that such information has been successfully received from the integrated management system 300 (S34).

Further, the ground identification device 200 may transmit an access message including the identification information of the drone, which is received from the drone, to the integrated management system 300 (S35), and receive a response message indicating that the identification information of the drone has been successfully received from the integrated management system 300 (S36).

Figure 4:
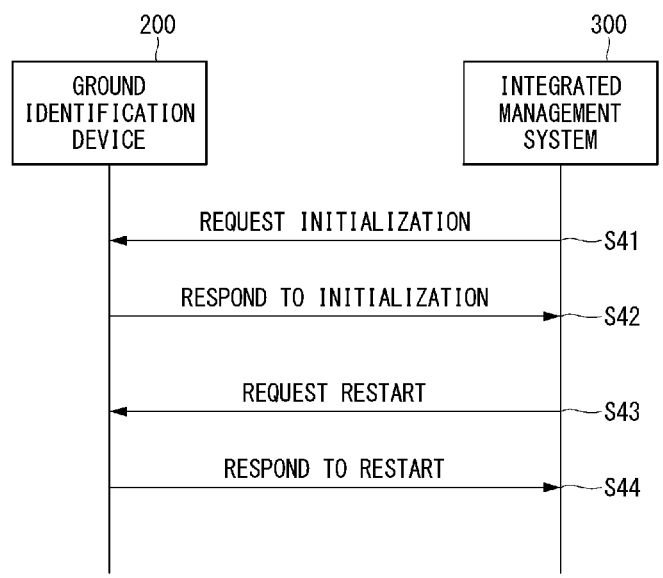
FIG. 4 is a flowchart for describing another embodiment of the interworking function between the ground identification device and the integrated management system that can be employed in the system of FIG. 1.

FIG. 4 is a flowchart for describing another embodiment of the interworking function between the ground identification device and the integrated management system that can be employed in the system of FIG. 1.

In the present embodiment, the ground identification device 200 and the integrated management system 300 interwork with each other to manage the identification information of the drone. In this case, in order to manage the identification information of the drone, the integrated management system 300 may first request to perform an initialization procedure for access or perform a restart procedure during access, from the ground identification device 200.

Referring to FIG. 4, the integrated management system 300 may request initialization in order to reset the information of the ground identification device 200 (S41), and receive a response to the initialization request from the ground identification device 200 (S42). In this case, the ground identification device 200 may initialize the information including the identifier previously allocated in response to the initialization request.

Further, the integrated management system 300 may use an access message to request a restart for performance management of the ground identification device 200 (S43), and receive a response to the restart request from the ground identification device 200 (S44). Here, the ground identification device 200 may use an access message to transmit a restart response message to the integrated management system 300 and then may restart the system. In this case, the ground identification device 200 may maintain the existing information including the identifier which is allocated from the integrated management system 300 without change.

Figure 5:
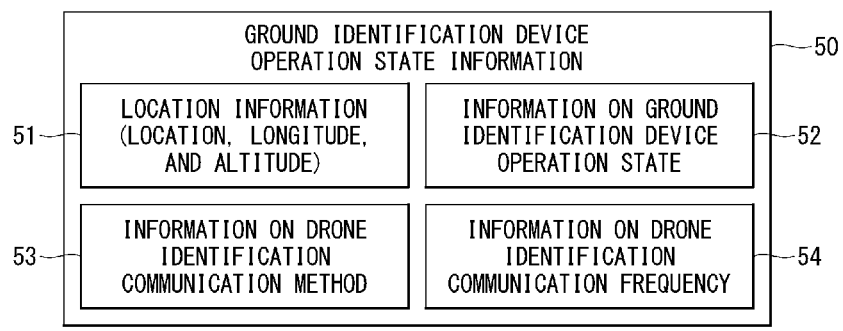
FIG. 5 is a configuration diagram of operation state information of a ground identification device that can be employed in the system of FIG. 1.

FIG. 5 is a configuration diagram of operation state information of a ground identification device that can be employed in the system of FIG. 1.

Referring to FIG. 5, operation state information 50 of the ground identification device includes location information 51 including latitude, longitude, and altitude information of the ground identification device, ground identification device operation state information 52 indicating whether the ground identification device operates normally or a problem occurs, communication method information 53, which includes a communication method used for drone identification, for example, Wi-Fi, Bluetooth, etc., and drone identification communication frequency information 54, which includes a communication frequency used for drone identification, for example, a frequency of about 433 MHz, about 915 MHz, etc.

Figure 6:
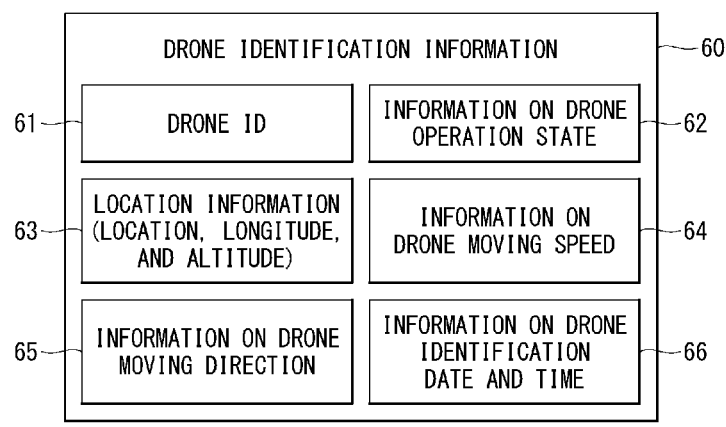
FIG. 6 is a configuration diagram of drone identification information that can be employed in the system of FIG. 1.

FIG. 6 is a configuration diagram of drone identification information that can be employed in the system of FIG. 1.

Referring to FIG. 6, drone identification information 60 may be transmitted from a ground identification device to an integrated management system and stored in the integrated management system. Further, the drone identification information 60 may be transmitted from a controller to the integrated management system and stored in the integrated management system.

The drone identification information 60 may include drone ID information 61, which is unique information for distinguishing a drone, drone operation state information 62 for transmitting information on a state such as a state before take-off, a state in flight, an emergency situation, etc., location information 63 including latitude, longitude, and altitude information, drone movement speed information 64 on a speed at which the drone moves, drone movement direction information 65 on a direction in which the drone moves, drone identification date and time information 66, and the like.

Here, the emergency situation may include a state such as a low battery, an emergency landing, or the like.

Figure 7:
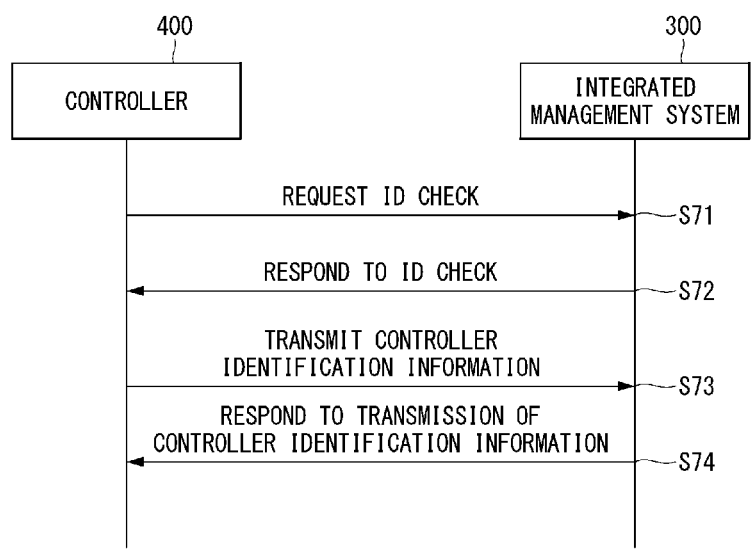
FIG. 7 is a flowchart for describing an interworking function between a controller and an integrated management system that can be employed in the system of FIG. 1.

FIG. 7 is a flowchart for describing an interworking function between a controller and an integrated management system that can be employed in the system of FIG. 1.

In the present embodiment, an integrated management system 300 may manage drone identification information of a drone by interworking with a controller 400 that controls the drone, instead of a ground identification device. In this case, the controller 400 may receive the identification information or flight-related information from the drone.

Referring to FIG. 7, the integrated management system 300 may receive an identifier check request message from the controller 400 (S71) and transmit a response message to the identifier check request message to the controller 400 (S72). In this case, the integrated management system 300 may check an identifier for the corresponding controller 400 in response to the identifier check request message, and add a result of the check to the response message to transmit the response message to the controller 400.

The identifier check should be performed first for interworking between the controller 400 and the integrated management system 300, and thereafter, when the controller 400 and the integrated management system 300 transmit or receive the information to or from each other, the identifier may be added to the information and transmitted.

Further, the integrated management system 300 may receive controller identification information including the identifier for the controller from the controller 400 (S73), and transmit a response indicating that the controller identification information has been successfully received to the controller 400 (S74).

Figure 8:
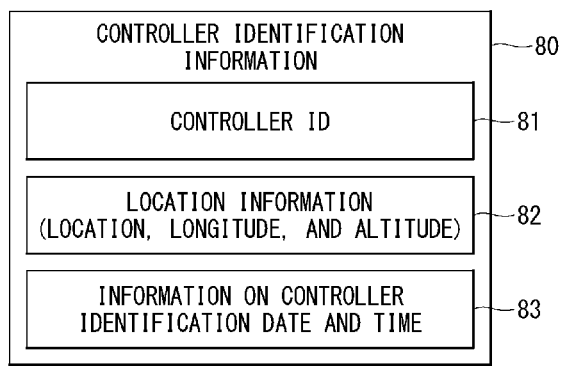
FIG. 8 is a configuration diagram of controller identification information that can be employed in the system of FIG. 1.

FIG. 8 is a configuration diagram of controller identification information that can be employed in the system of FIG. 1.

Referring to FIG. 8, controller identification information 80 that is transmitted from a controller to an integrated management system and stored in the integrated management system may include controller ID information 81, which is unique information for distinguishing a drone, location information 82 including latitude, longitude, and altitude information of the drone, controller identification date and time information 83, and the like.

Figure 9:
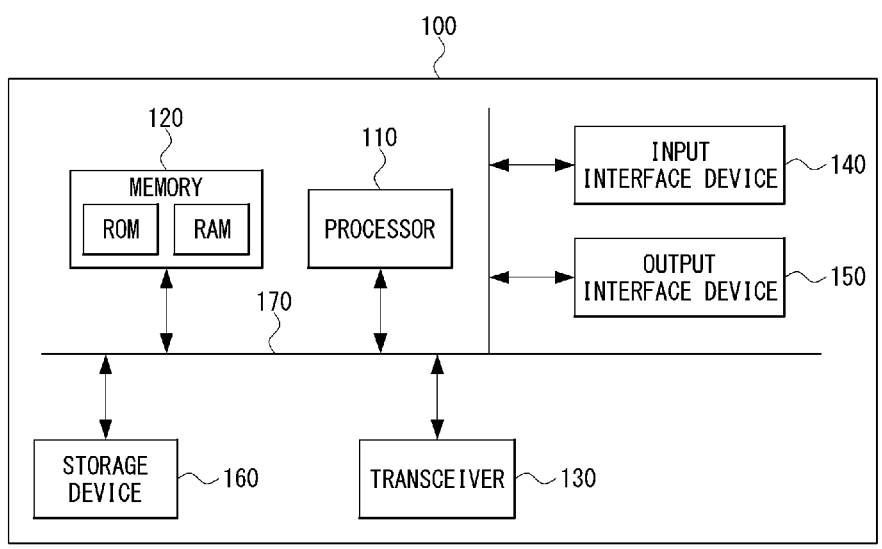
FIG. 9 is a block diagram illustrating a configuration of hardware of a drone identification information management apparatus that can be employed in the ground identification device, the integrated management system, or the controller of the drone identification information management system of FIG. 1.

FIG. 9 is a block diagram illustrating a configuration of hardware of a drone identification information management apparatus that can be employed in the ground identification device, the integrated management system, or the controller of the drone identification information management system of FIG. 1.

Referring to FIG. 9, a drone identification information management apparatus 100 is a component that performs at least some functions of the integrated management system, and may include at least one processor 110, a memory 120, and a transceiver 130 that is connected to a network to perform communication. Further, the drone identification information management apparatus 100 may further include an input interface device 140, an output interface device 150, a storage device 160, or the like. The respective components included in the drone identification information management apparatus 100 may be connected to each other through a common bus 170 to communicate with each other.

However, the respective components included in the drone identification information management apparatus 100 may be connected to each other through an individual interface or an individual bus centering on the processor 110 instead of the common bus 170. For example, the processor 110 may be connected to at least one of the memory 120, the transceiver 130, the input interface device 140, the output interface device 150, and the storage device 160 through a dedicated interface.

The processor 110 may execute a program or instructions stored in at least one of the memory 120 and the storage device 160. The processor 110 may be a central processing unit (CPU), a graphics processing unit (GPU), or a dedicated processor on which the methods according to the exemplary embodiments of the present disclosure are performed.

Each of the memory 120 and the storage device 160 may be configured as at least one of a volatile storage medium and a non-volatile storage medium. For example, the memory 120 may be configured as at least one of a read-only memory (ROM) and a random-access memory (RAM).

The memory 120 and the storage device 160 may store an access message generation module, an access message transmission module, an access message reception module, an access message management module, an identifier management module, an identifier allocation request module, an identifier allocation module, an identifier allocation response module, a ground identification device operation state transmission module, a ground identification device operation state management module, a ground identification device operation state message generation module, a ground identification device operation state information transmission response module, a drone identification information generation module, a drone identification information management module, a drone identification information transmission module, a drone identification information transmission response module, an initialization request module, an initialization processing module, an initialization response module, a restart request module, a restart processing module, a restart response module, a controller identifier management module, a controller identifier check request module, a controller identifier check response module, a controller identification information generation module, a controller identification information transmission module, a controller identification information transmission response module, a controller identification information management module, or combinations thereof. At least some of the above modules are software modules and may be mounted on the processor 110 to perform corresponding functions under the control of the processor 110.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of managing, by a ground identification device, identification information of a drone, the method comprising:
   generating an access message including an identifier for a transmitter that corresponds to an identifier for the ground identification device, which is the transmitter, wherein the access message further includes an identifier for a receiver, an execution function command for classifying and defining a function to be performed, a serial number for transmitting information sequentially and retransmitting the information when transmission fails, data size information for informing a size of data to be transmitted, and transmission data; and
   transmitting the access message to an integrated management system corresponding to the identifier for the receiver.

2. The method of claim 1, further comprising:
   transmitting other access message for requesting the identifier for the transmitter to the integrated management system before the generating of the access message; and
   receiving a response message for allocating the identifier for the transmitter in response to the other access message for the request from the integrated management system,
   wherein the identifier for the transmitter which is allocated by the integrated management system is used when a subsequent access message is configured.

3. The method of claim 2, further comprising:
receiving a third access message for an initialization request from the integrated management system;
performing an initialization process in response to the third access message for the initialization request; and
transmitting an initialization response message corresponding to the third access message for the initialization request to the integrated management system.

4. The method of claim 1, wherein the generating of the access message includes setting an execution function command for transmitting operation state information of the ground identification device, generating data size information, and configuring transmission data including the operation state information of the ground identification device.

5. The method of claim 4, wherein the operation state information of the ground identification device includes location information including a location, a longitude, and an altitude, first information related to an operation state of the ground identification device, second information related to a communication method used for drone identification, and third information related to a communication frequency used for drone identification.

6. The method of claim 1, wherein the generating of the access message includes setting an execution function command for transmitting the identification information of the drone, generating data size information, and configuring transmission data including the identification information of the drone.

7. The method of claim 6, wherein the identification information of the drone includes an identifier for the drone, an operation state of the drone, location information including a location, a longitude, and an altitude of the drone, a moving speed of the drone, a moving direction of the drone, and an identification date and time of the drone.

8. The method of claim 1, further comprising:
receiving other access message for a restart request from the integrated management system;
performing a restart process in response to the other access message for the restart request, wherein, in the restart process, integrated management information including the identifier for the ground identification device and an identifier for the integrated management system, which are allocated from the integrated management system, is maintained; and
transmitting a restart response message corresponding to the other access message for the restart request to the integrated management system.

9. A method of managing, by an integrated management system connected to a ground identification device through a network, identification information of a drone, the method comprising:
receiving an access message from the ground identification device, wherein the access message includes an identifier for the ground identification device, which is a transmitter, an identifier for the integrated management system, which is a receiver, an execution function command for classifying and defining a function to be performed by the ground identification device, a serial number for transmitting information sequentially and retransmitting the information when transmission fails, data size information for informing a size of data to be transmitted, and transmission data;
interworking with at least one of the ground identification device and a drone controller for drone identification on the basis of the information included in the access message; and
receiving other access message including the identification information of the drone from at least one of the ground identification device and the drone controller,
wherein the identification information of the drone includes an identifier for the drone, an operation state of the drone, location information including a location, a longitude, and an altitude of the drone, a moving speed of the drone, a moving direction of the drone, and an identification date and time of the drone.

10. The method of claim 9, further comprising:
receiving a third access message for requesting identifier allocation from the ground identification device;
allocating a first identifier for the ground identification device; and
transmitting a response message including the first identifier to the ground identification device.

11. The method of claim 10, further comprising, after the transmitting of the response message to the ground identification device is performed, receiving a message including operation state information of the ground identification device from the ground identification device.

12. The method of claim 11, wherein the operation state information of the ground identification device includes location information including a location, a longitude, and an altitude, first information related to an operation state of the ground identification device, second information related to a communication method used for drone identification, and third information related to a communication frequency used for drone identification.

13. The method of claim 10, further comprising:
transmitting a fourth access message for an initialization request to the ground identification device; and
receiving an initialization response message corresponding to the fourth access message for the initialization request from the ground identification device.

14. The method of claim 10, further comprising:
transmitting a fifth access message for a restart request to the ground identification device; and
receiving a restart response message corresponding to the fifth access message for the restart request from the ground identification device,
wherein, in the restart process performed by the ground identification device in response to the fifth access message for the restart request, integrated management information including the identifier for the ground identification device and the identifier for the integrated management system, which are allocated from the integrated management system, is maintained.

15. The method of claim 9, further comprising receiving another access message including other identification information of the drone from a controller of the drone.

16. The method of claim 15, further comprising:
before the receiving of the another access message including other identification information of the drone from the controller is performed,
receiving a sixth access message for a controller identifier check request from the controller;
transmitting a controller identifier check response message corresponding to the sixth access message for the controller identifier check request to the controller; and
receiving identification information of the controller from the controller.

17. The method of claim 16, wherein the identification information of the controller includes an identifier for the controller, location information of the controller, and an identification date and time of the controller.

18. An apparatus for managing identification information of a drone, the apparatus comprising:
- a ground identification device access device configured to access a ground identification device that receives a signal from the drone and transmit information;
- a controller access device configured to access a controller of the drone and transmit information;
- an identification information management device configured to manage the identification information of the drone, which is received through the ground identification device access device, the controller access device, or both the ground identification device access device and the controller access device; and
- a database configured to store the identification information,
- wherein the ground identification device access device allocates an identifier to the ground identification device in response to a request of the ground identification device to transmit the identifier for the ground identification device to the ground identification device, and receives an access message including operation state information of the ground identification device as transmission data from the ground identification device,
- the controller access device allocates an identifier to the controller in response to a request of the controller to transmit the identifier for the controller to the controller, and receives other access message including operation state information of the controller as transmission data from the controller, and
- the access message or the other access message includes an identifier for a transmitter, an identifier for a receiver, an execution function command for classifying and defining a function to be performed, a serial number for transmitting information sequentially and retransmitting the information when the transmission fails, data size information for informing a size of data to be transmitted, and transmission data.

19. The apparatus of claim 18, wherein the operation state information of the ground identification device includes location information including a location, a longitude, and an altitude, first information related to an operation state of the ground identification device, second information related to a communication method used for drone identification, and third information related to a communication frequency used for drone identification.

20. The apparatus of claim 18, wherein the identification information of the controller includes the identifier for the controller, location information of the controller, and an identification date and time of the controller.

* * * * *